United States Patent [19]
Schiller

[11] Patent Number: 5,526,897
[45] Date of Patent: Jun. 18, 1996

[54] CARPENTRY WORK STATION

[76] Inventor: Charles V. Schiller, 25 W. 231 Salem, Naperville, Ill. 60540

[21] Appl. No.: 364,848

[22] Filed: Dec. 27, 1994

Related U.S. Application Data

[63] Continuation of Ser. No. 929,343, Aug. 12, 1992, abandoned.

[51] Int. Cl.$^6$ ................................................ F16M 11/00
[52] U.S. Cl. .................. 182/129; 182/151; 182/181; 182/153
[58] Field of Search ..................... 182/129, 151, 182/153, 224, 181, 182, 183, 184, 185, 186

[56] References Cited

U.S. PATENT DOCUMENTS

| | | | |
|---|---|---|---|
| 1,303,416 | 5/1919 | Tidyman | 182/184 X |
| 2,832,647 | 4/1958 | Gerke | 182/182 |
| 2,911,265 | 11/1959 | Hannah | 182/181 |
| 3,035,660 | 5/1962 | Leon | 182/181 |
| 3,530,955 | 9/1970 | Rice | 182/181 |
| 4,062,423 | 12/1977 | Armbruster | 182/181 X |
| 4,105,091 | 8/1978 | Mahan . | |
| 4,182,432 | 1/1980 | Cossitt . | |
| 4,260,040 | 4/1981 | Kieffer | 182/181 |
| 4,433,753 | 2/1984 | Watson . | |
| 4,570,915 | 2/1986 | O'Hern | 182/181 X |
| 4,574,917 | 3/1986 | Stoddard . | |
| 4,596,308 | 6/1986 | Auerbach | 182/129 |
| 4,763,757 | 8/1988 | Cheney . | |
| 4,790,411 | 12/1988 | Ottoson | 182/153 X |
| 4,890,693 | 1/1990 | O'Brien | 182/181 X |
| 4,923,051 | 5/1990 | Newville . | |

*Primary Examiner*—Karen J. Chotkowski
*Attorney, Agent, or Firm*—Wallenstein & Wagner, Ltd.

[57] ABSTRACT

A carpentry work station (10) is disclosed that includes at least one main body (11) with two legs (40) connected and locked to thereto. The main body further has an upper longitudinal trough (31) that receives therein a T-shaped top member (81). The top member (81) is slidable within the trough (31) and can be locked in one of a plurality of positions relative to the main body (11).

47 Claims, 8 Drawing Sheets

CARPENTRY WORK STATION

This is a continuation of application Ser. No. 07/929,343 filed on Aug. 12, 1992 and now abandoned.

TECHNICAL FIELD

The present invention relates to assembled saw horses and, more particularly, to a carpentry work station that can be easily assembled and disassembled and can be used not only as a standard saw horse, but also can be used or transformed into an expanded saw horse to provide additional support surfaces, a tool holder, a vertical or horizontal plank holder, a power miter box stand, a table saw stand, a router table stand, a jig saw table stand and its own transportation and storage container.

BACKGROUND PRIOR ART

Saw horses are commonly used in carpentry work for supporting the work being worked on and the tools being used. For example, one may place two saw horses parallel one another, put a plank across the two horses' top surfaces, and saw or cut the plank. One important advantage to using saw horses is that when cutting items supported thereon, such as wood, it is common to cut completely through the item, such by sawing off an end, by contouring the sides, and by drilling a hole. If the item were on a table, the table could get defaced, marred or even ruined.

Today, saw horses are either permanently assembled wood or plastic or are collapsible. Examples of the former are common and examples of the latter are shown in U.S. Pat. Nos. 467,081, 3,035,660, 4,105,091, 4,182,432, 4,433,753, 4,574,917, 4,763,757, and 4,923,051. In each of these patents, one or more parts of the saw horse are disassembled from the main part for ease of storage and/or for ease of transportation. Unfortunately, these permanent saw horses and collapsible saw horses provide little more than a fixed work or support surface; some also provide means for maintaining the saw horse in the collapsed stage for storage or transportation. Consequently, because the saw horses cannot be expanded, the uses for such saw horses are very limited.

An example of one of the above noted saw horses is shown and claimed in U.S. Pat. No. 4,923,051. This patent shows a collapsible sawhorse comprised of three components, namely a main body portion, identified as an upright base plate, and two slottably connected interlocking leg plates. The top surface is rigidly connected to and extended transversely and outwardly from the base plate adjacent the top edge. The top surface includes a downwardly extending flange that partially defines a pocket between the base plate and the flange for temporarily receiving and supporting one or more leg plates in a generally stacked engagement with the base plate upon inversion of the base plate. As noted, this type of saw horse is usable only in a limited capacity, as a work and support surface. Also, while it may appear to be advantageous to invert the base plate and carry the removed legs in the pre-formed pockets adjacent thereto, it also subjects the top surface to potential damage and abuse. For example, as with a suit case, one carrying this horse in its collapsed condition could easily drag it on the ground or drop it. With respect to the leg plate connections, there are no means provided for ensuring the holding of the legs to the main body. Consequently, one lifting or moving the assembled horse might be faced with one or both legs falling from the main body.

These and other disadvantages found in the art are overcome by the present invention which provides improvements thereover, as well as novel elements and components thereto. Specifically, the carpentry work station of the present invention can be expanded so as to increase the working and supporting surfaces. It can be set up as a power miter box stand, a power table saw stand, a router table stand, and a jig saw table stand. In addition, planks of different sizes can be held in a number of different positions for working thereon or for providing an extra work shelf. Pipes can be further held for working on. Moreover, the present invention holds tools and instruments for easy access by the worker.

SUMMARY OF THE INVENTION

According to one aspect of the present invention, the carpentry work station comprises a main body for supporting work thereon at a manageable, accessible and workable height. The main body has opposed ends, opposed sides and a top and a bottom. The top of the main body forms a top surface and has a longitudinal, elongated trough therein for receiving a top member. The top member cooperates with this top trough and is received and slidably mounted therein for extending the top surface area for supporting work.

The top member is an elongated T-shaped member having three top member legs. Preferably, each of the top member legs fits into the trough.

Means are further provided for fixedly securing the top member to the main body in any one of a plurality of positions. The securing means includes a plurality of horizontal spaced apart pin holes along the sides of the vertical leg of the top member, a plurality of horizontal spaced apart pin holes in the main body adjacent the top that extend from one side of the main body into the top trough and at least one pin inserted into a pair of aligned pin holes. One aligned pin hole is in the top member leg and the other aligned pin hole is in the main body. By removing the pin from the aligned holes, moving the top member and inserting the pin into a separate set of aligned pin holes, the top member can be fixedly secured in another position relative to the main body.

Pin holes are also provides in the sides of the other two legs of the main body for permitting the top member to be locked to the main body in any number of orientations by the insertion of a pin into a pair of aligned pin holes, one pin hole being in the top member leg and the other pin holes being in the main body adjacent the top.

According to another aspect of the present invention, means for supporting the main body above the ground are provided. In particular, the bottom of the main body has at least two inwardly projecting, spaced apart elongated leg channels, each terminating at a leg channel abutment. A pair of legs, each leg having a leg top and a leg bottom and having a downwardly projecting elongated leg slot terminating at a leg slot abutment, are provided for coupling with the two channel slots.

Specifically, each leg is slottably connected, or interconnected, to the main body by having the leg channel in the main body receive the leg slot of the leg in such a manner that the leg channel abutment and the leg slot abutment generally abut one another. When slottably connected, a portion of the main body is positioned within the leg slot and a portion of the leg is positioned within the leg channel.

According to a further aspect of the present invention, at least one side of the main body is substantially vertical and both of leg slots include a first slot notch, forming a generally horizonal first slot ledge and a generally vertical first slot holding wall therein, and a second slot notch, forming a generally horizontal second slot ledge and a generally vertical second slot holding wall therein. With this structure, when the legs are slottably connected to the main body, a plank can be held substantially vertical on one of the two slot ledges of both the legs between the vertical side of the main body and one of the two slot holding walls of both the legs. The two notches are provided so as to permit the vertical holding of planks of different thicknesses.

According to an additional aspect of the present invention, means are provided for locking the legs to the main body. The means for locking the legs to the main body includes a pair of opposed leg indents positioned below the leg slot in each leg and a leg channel cavity in each of the leg channels, with a strip spring fastened to the leg slot abutment. The strip spring is positioned in the leg channel cavity and is generally C-shaped with two ends forming an opening therein. Each of the two ends has an inwardly projecting nub for frictionally engaging one of the opposed leg indents and holding the leg to the main body when the leg is slottably connected to the main body.

According to still further aspects of the present invention, the main body has a body cut-out therein and a body pocket formed therein between the two sides and adjacent the body cut-out. Moreover, one of the ends of the main body is contoured so as to form a generally horizontal ledge and a first upper flange and a second upper flange spaced above the first upper flange. As a result of this structural contouring, a substantially horizontal work shelf is easily formed and maintained by insertion of a plank between the horizontal ledge and one of the two second upper flanges. The two upper flanges are provided so as to permit the forming and holding horizontally of planks of different thickness.

With the additional use of a second main body, that is substantial similar to the first main body, positioned parallel one another, a substantially horizontal work shelf can be formed and maintained by insertion of a plank between the ledges of both the main bodies and either the two first upper flanges or the two second upper flanges of the two main bodies. In addition, a pipe recess is provided in the horizontal ledges to support a horizontal pipe of other round members.

One end of the main body is further contoured inwardly and has at least one receptacle formed therein for storing pins when they are not in use for retaining the top member to the main body.

According to another aspect of the present invention, the bottom of the main body is provided with one or more carriers for holding a second main body and four legs adjacent the sides of the main body. This greatly aids in both the storage and transportation of the present invention. One or more carrier extensions are fixedly secured to the bottom of the main body and extend outwardly in a direction away from one side or both sides of the main body. Each carrier extension has an upwardly projecting carrier flange fixedly secured to the distal end thereof for forming the carrier between the one side of the main body and the carrier flange adjacent the bottom of the main body. A plurality of wheels extending downwardly from each carrier extension are further provided for permitting one to roll the entire carpentry work station when the station is disassembled and not set-up.

According to a still further aspect of the present invention, the carpentry work station can be transformed into a power miter box stand. Two main bodies are positioned adjacent one another's ends so as to form a line. A central top member having opposed ends and a vertical leg and being generally T-shaped in transverse cross-section is placed in the trough of the first main body and in the trough of said second main body. A first top member is placed and locked into the upper longitudinal trough of the first main body adjacent one end of the central top member and a second top member is placed and locked into the upper longitudinal trough of the second main body adjacent toe other end of the central top member. The central top member is locked, via pins and aligned holes, into the two adjacent upper troughs and a miter box is secured to the central top member. The width of the horizontal portion of the central top portion is greater than the width of the horizontal portions of the first and the second top portions.

Further securement means for fixedly connecting the central top member to the first and the second main bodies are also provided that include a rod having external threads connected to and projecting downwardly from said vertical leg of the central top member, a wheel member having internal threads for cooperating with said male thread of said rod, and a horizontal bar disposed between the vertical leg and the wheel. The distance between the horizontal bar and the horizontal portion of the central member is controllable by turning the wheel member. The rod is positioned between the adjacent ends of the first main body and the second main body and the wheel turned so that a portion of both the main bodies is clamped between the horizontal bar and the horizontal portion of the central top member when the vertical leg of central top member is disposed within the longitudinal troughs of both main bodies.

The carpentry work station can also be transformed into a power miter box stand with only one main body. The central top member is placed and locked into the upper trough of the sole main body and each of the two top members is placed and locked into the upper longitudinal trough adjacent an opposed end of the central top member. The locking of the central top member, first top member and second top member is again done with pins placed into aligned holes. The miter box is secured to the central top member.

To aid in the use of the power miter box, a rail member is provided for supporting work pieces on the power miter box stand. The rail member includes a rest, at least two parallel rods depending downwardly from this rest, a channel member having an internal T-shaped channel that fits generally around the top member and that has internal rod holes for receiving the two parallel rods, and means for adjusting the distance between the rest and the channel member. The means for adjusting the distance between the rest and the channel member is a fastener cooperating with the parallel rods, each fastener comprising a housing and a threaded stud, with the stud fictionally engaging one of the parallel rods.

According to yet a further aspect of the present invention, the carpentry work station can be transformed into a power table saw stand. Two main bodies are positioned generally parallel one another and a table element having a top surface and a bottom surface and a blade slot therein is positioned and locked into the two upper longitudinal troughs. Specifically, the bottom surface of the table element has a pair of outwardly projecting parallel posts; one post fits into the upper trough in the first main body and the other post fits into the upper trough of the second, parallel main body. A saw is fixedly secured adjacent the bottom surface of the table element with the saw blade projecting through the blade slot.

In addition, the bottom surface of the table element has a second pair of outwardly projecting posts perpendicular to the first pair of projecting posts for permitting the table element to be oriented such that the blade slot is either parallel the parallel first and second main bodies or transverse the parallel first and second main bodies. Each of the posts has a pin holes therein for fixedly securing the table element to both the main bodies by inserting pins into pairs of aligned pin holes in the posts and in the main bodies extending from the sides into the troughs. The two top members can be positioned and fixed into the main bodies adjacent the table element member to provide additional work surface area. And, a saw fence element for fixedly securing to the table element in any one of a plurality of positions is provided for guiding work pieces that are supported on the top surface of the table element.

A fence element and intermediate support are further provided for supporting work adjacent the table element and for acting as a boundary. The intermediate support is a T-shaped component that fits between and on the parallel top members of the parallel-placed main bodies. The fence element includes an L-shaped block having a front face and a channel with a strike plate therein. Locking means comprising a cam, lever and gripping are provided for urging the strike plate against the top member, thereby locking it.

A clamp member is further provided for orienting both horizontally or vertically to clamp items on or to the main body. The clamp member includes a horizontal post with a vertical post integral with one end thereof. The vertical post extends both above and below the horizontal post and has a plurality of pin holes therein. At the other end of the horizontal post, a neck portion supports the clamping mechanism, i.e., turn bar, couplers, threaded rod and head.

Other advantages and aspects of the present invention will become apparent upon reading the following description of the drawings and detailed description of the invention.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
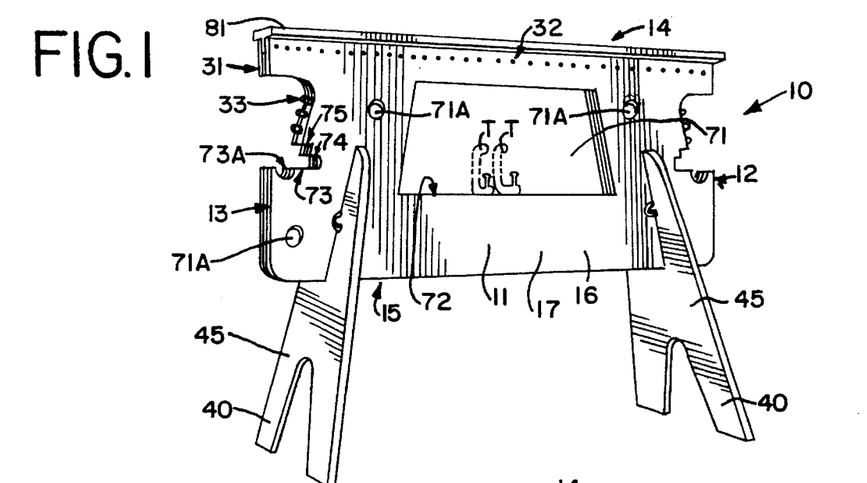
FIG. 1 is a first side perspective view of the assembled carpentry work station made in accordance with the teachings of the present invention (without a carrier)

FIG. 1 shows a carpentry work station of the present invention, designated with the reference number 10, that has been assembled. The work station 10 is primarily used to support one's work above the ground at a convenient and accessible height. The work station 10 has an elongated main body 11 that has opposed ends 12,13, opposed sides 16,17, a bottom 15 and a top 14. The main body 11 is supported above the ground by a pair of legs 40 slottably connected thereto. In particular, the bottom 15 of the main body 11 has two inwardly projecting elongated leg channels 21 (FIG. 18) formed therein that terminate at a leg channel abutment 21a.

Figure 17:
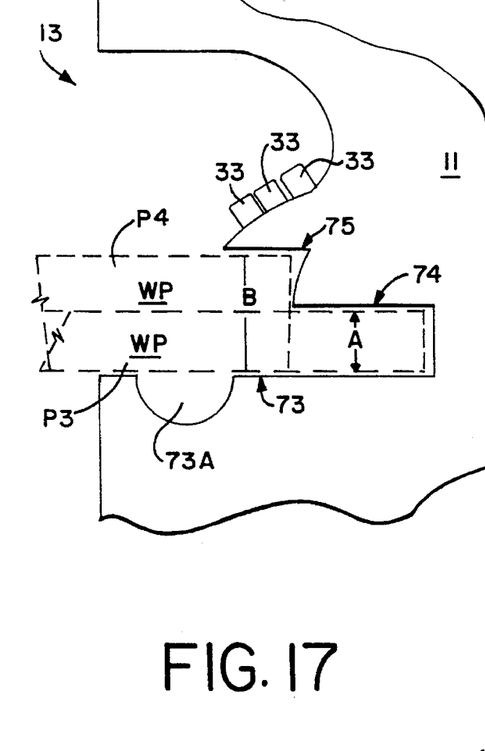
FIG. 17 is an end elevation view of the leg shown in the figures.

Each leg 40, shown in detail in FIG. 17, has two sides 48 and includes a leg bottom 41 and a leg top 42. The leg bottom 41 has a leg cut-out 44 for reducing material usage and weight and the leg top 42 has a downwardly projecting elongated leg slot 43 terminating at a slot abutment 43a for cooperating with the leg channel 21 of the main body 11. The width of the channel slot 21 is approximately a little larger than the side-to-side (45,45) width of the leg 40 and the width of the leg slot 43 is approximately a little greater than the side-to-side (16,17) width of the main body 11.

To assemble, tools are not necessary. The main body 11 and each leg 40 are first oriented in such a manner that they are perpendicular to one another and are aligned so that the leg channel 21 is generally adjacent the leg slot 43. The legs 40 are next inserted and pushed into the main body 11 so that the leg channel 21 and the leg slot 43 mate one another. The legs 40 are interlocked when the leg channel abutment 21a and the leg slot abutment 43a generally contact one another and a portion of the main body is disposed within the leg slot and a portion of the leg is disposed within the leg channel.

For added stability, the leg channels 21 are not perpendicular to the ground and bottom 15 of the main body 11; rather, they are inwardly inclined. Accordingly, when the legs 40 are interconnected to the main body 11, the legs are inclined to the ground such that from the side, the space defined by the to legs, the bottom 15 of the main body and the ground is trapezoidal in shape.

Further, for added security, locking means are included for locking the legs 40 to the main body 11 and for minimizing the possibility of any sliding between the legs and the main body when they are interconnected. The locking mechanism, shown in the detail of FIG. 18, comprises a strip spring 51 fastened by conventional means to the leg channel abutment 21a. The strip spring is preferably made of a thin metal or hard, flexible plastic. The strip spring 51 has an arcuate portion 52 terminating at two ends 53. The two ends 53 are bent inwardly so as to form two nubs 55 with an opening 54 therebetween that faces outwardly to the opening 21b of the leg slot. To accommodate the connected strip spring 51, the leg channel 21 includes a channel cavity 22 spaced a distance from the bottom 15 of the main body 11 and the leg channel 21b opening. The legs 40 have indents 46 in each side 45 thereof positioned below the leg slots 43 (FIG. 17).

Figure 18:
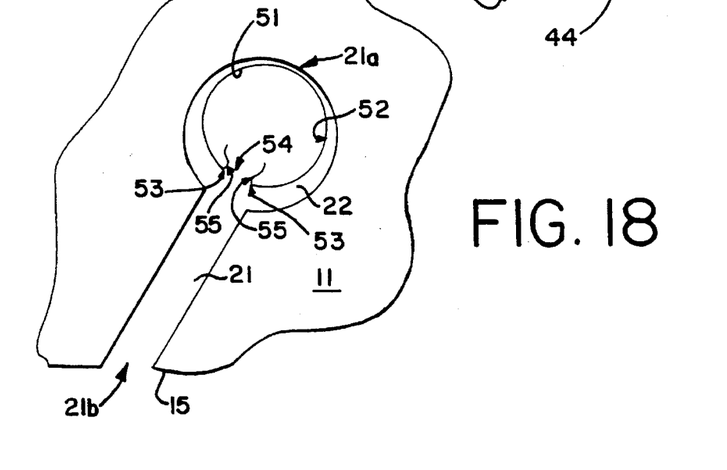
FIG. 18 is a detail of the leg channel of the main body shown in the figures.
Figure 19:
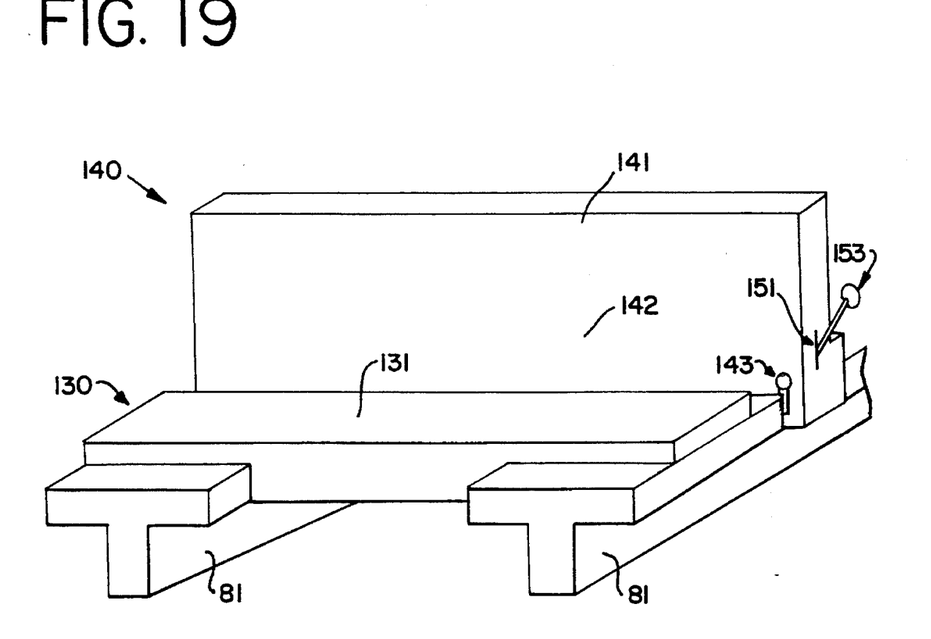
FIG. 19 is a side perspective view of a fence element and intermediate support.
Figure 20:
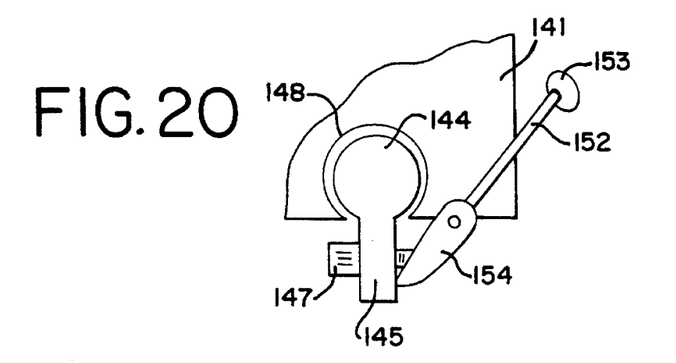
FIG. 20 is a front view of the striker plate.
Figure 21:
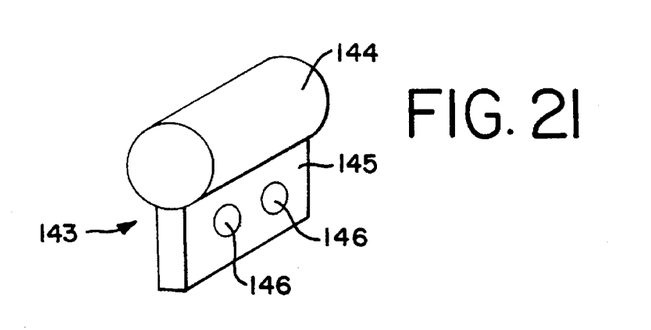
FIG. 21 is an isometric view of the striker plate.

Thus, when a leg 40 is inserted into the leg channel 21 of the main body 11, the leg contacts the strip spring 51 at the opening 54, spreading the spring apart as it passes therethrough. At the point of interconnection, when the slot abutment 43a contacts the channel abutment 21a or the spring 51 fastened to the leg channel abutment, each of the nubs 55 of the spring 51 is received in the opposed indents 46 in the leg 40. The strip spring 51 thereafter frictionally engages and holds the leg 40 between the two nubs 55. Thus, the main body 11 with the interconnected and locked legs 40 can be lifted and moved without fear of the legs disassembling and separating from the main body. To remove a leg 40 from the main body, a strong downward force is applied to the leg causing the nubs 55 to slide out of the opposed indents 46 in that leg and the strip spring 51 to spread apart as it slides across the sides 45 of the leg. Eventually, as the downward force is continued, the sides 45 of the leg 40 clear the opening 54 and nubs 55 of the spring 51 freeing the leg.

The legs 40 are further provided with means for holding work pieces, and in particular planks of different thicknesses, substantially vertical. As shown in the figures, the sides 16,17 of the main body 11 are preferably substantially vertical. Shown in detail in FIG. 17, the leg slots 43 in each leg 40 include a slot notch 47 forming a generally horizonal slot ledge 47a and a generally vertical slot holding wall 47b for holding a work plank substantially vertical on the formed slot ledge between the one side 17 of the main body 11 and the slot holding wall. The main body 11 and a first work plank P1 are shown in phantom lines in FIG. 17. Consequently, when both of the legs 40 are interconnected with and locked into the main body 11 and the slot notches 47 are both adjacent the same side 17 of the main body a plank P1 can be easily supported vertically on the two legs. Significantly, work planks having a cross-sectional thickness of up to the dimension C can be so held.

In addition, the leg slots 43 in each leg 40 can also include above the first slot notch 47, a second slot notch 48 forming a generally horizonal slot ledge 48a and a generally vertical slot holding wall 48b therein for holding a work plank substantially vertical on the formed slot ledge between the one side 16 of the main body 11 and the slot holding wall. With reference again to FIG. 17, a second work plank P2 is shown in phantom lines adjacent the second side 16 of the main body 11. As before, when both of the legs 40 are interconnected with and locked into the main body 11 and the slot notches 48 are both adjacent the same side 16 of the main body a plank can be easily supported vertically on the two legs. With this arrangement, work planks having a cross-sectional thickness of greater than the dimension C but less the dimension D can be so held. Of course while only notches 47,48 on one side of the leg slots 43 have been discussed, notches be made on both sides of the leg slot, as is shown in FIG. 17. When notches are employed on both sides of the leg slot 43, one has the choice of holding planks vertically adjacent either side 16,17 of the main body 11. This arrangement also eliminates any possible errors in aligning the leg slots in the legs 40 incorrectly.

In practice, it has been found that employing three slot notches work well. A first slot notch has a dimension C of about 7/8" to accommodate a plank having a nominal width of 3/4". Similarly, a second notch has a dimension D of about 1 5/8" to accommodate a plank having a nominal width of 1 1/2". And, a third notch (not shown) has a transverse dimension of about 1 7/8" to accommodate a plank having a nominal width of 1 3/4.

Figure 2:
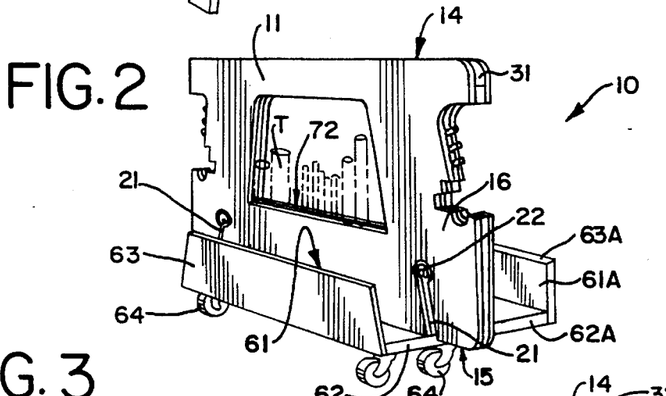
FIG. 2 is a second side perspective view of a disassembled main body made in accordance with the teachings of the present invention (with a carrier)
Figure 3:
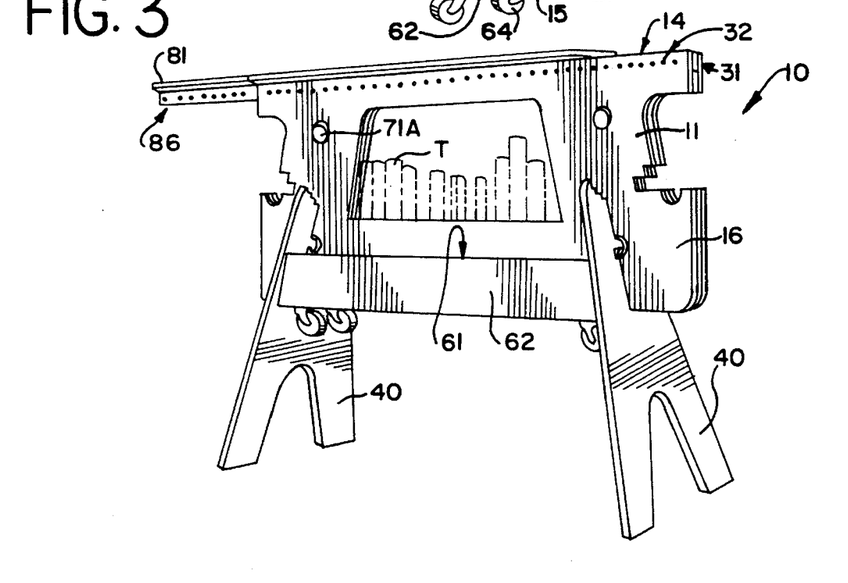
FIG. 3 is a second side perspective view of the assembled carpentry work station shown in FIG. 2.
Figures 4, 5, 6:
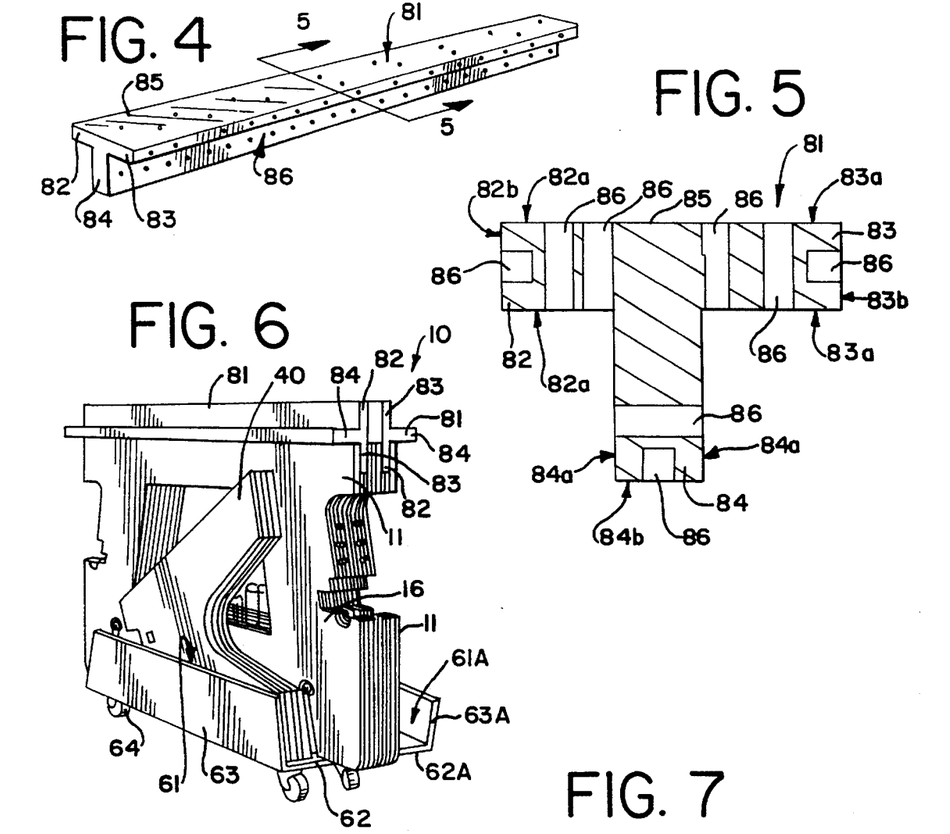
FIG. 4 is a side perspective view of the top member shown in FIGS. 1 and 3.
FIG. 5 is a sectional view taken along line 5—5 of FIG. 4.
FIG. 6 is a side perspective view of the carpentry work station made in accordance with the teachings of the present view invention disassembled and arranged for storage and/or transportation.
Figure 7:
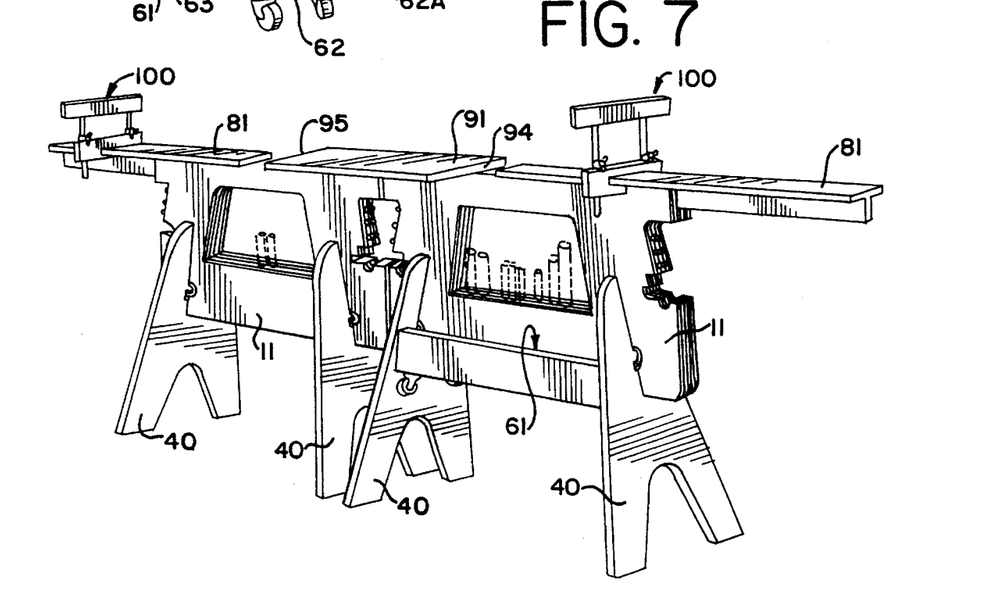
FIG. 7 is a side perspective view of the carpentry work station made in accordance with the teachings of the present embodiment transformed into a miter box stand.

For transportation and storage, the carpentry work station also includes one or more integral carriers 61, which are shown in FIGS. 2, 6 and 7. The bottom 15 of the main body 11 has a carrier extension 62 fixedly secured thereto that extends outwardly in a direction generally away from and perpendicular one side 16 of the main body. And, the carrier extension 62 has an upwardly projecting carrier flange 63 fixedly secured to the distal end thereof. Thus, a carrier 61 is formed between the one side 16 of the main body 11 and the carrier flange 63 adjacent the bottom 15 of the main body. As shown in both FIGS. 2 and 3, the carrier extension 62 is located between the two inwardly projecting leg channels 21 so that when the legs 40 are connected to the main body 11, the carrier 61 is disposed between the legs. Additionally, a set of wheels 64 can be attached to the carrier extension 62.

Moreover, while only one carrier is discussed in detail, a second carrier 61A constructed similarly can be formed between the other side 17 of the main body 11 and a second carrier flange 63A.

At this juncture, it should be noted that while thus far the carpentry work station 10 has been described as having one main body 11 with its attached legs 40, it is desirous, in order to gain the full advantages of the many features, aspects and uses of this assembly, that the work station can, and often should, have two separate main bodies 11, each having its attachments and components. Some of these additional advantages, features, aspects and uses will be discussed later.

FIG. 6 shows the carpentry work station 10 of the preferred embodiment in its desired disassembled condition for storage and transportation. The first carrier 61 is sized so as to hold on the carrier extension 62 the two legs 40 and the other main body, adjacent the side 16 of the main body 11 (the one with the carrier attached to it) between the side 16 and the carrier flange 63. The second, opposed carrier 61A is sized so as to hold on the carrier extension the other two legs 40 between the side 17 and the carrier flange. Other components, to be described, such as the table element 110 and the central top element 91, can further be stowed in the carriers 61 and 61A. Moreover, when the carpentry work station 10 is assembled and the stored components removed from the carrier 61, the carriers can be used to hold, among other things, tools, work pieces, scraps, containers for adhesives and cans of paint.

Referring back to FIGS. 1–3, the main body 11 of the work station 10 of the present invention further includes a body cut-out 71 centrally located therein for reducing the weight and the material of the assembly and for gaining access to a body pocket 72 also located therein. In particular, a body pocket 72 for holding various tools and clamps T can be easily formed in the interior of the main body during molding, if plastic, or during lamination, if wood. For example, if the main body is of laminated wood, a few of the layers may be eliminated below the body cut-out 71 to provide a pocket 72. Once the pocket 72 is formed, an insert may put therein for holding the tools and clamps T. It has been found that a suitable inset is a piece of carpet or ASTROTURF® folded into a U-shape, with the opening facing upwards. This folded carpet/ASTROTURF® grips tools and clamps and other objects of differing sizes quite satisfactorily.

Further, body holes 71A (shown in FIGS. 1 and 3) are provided for receiving dowel rods or pipes (not shown). Cylindrical dowel rods can be inserted in the body holes 71A and loosely held add supported. With the dowel rod or pipe supported in this manner, it can be worked on, i.e. sawed, sanded, tapered, threaded, etc. Body holes 71A of different sizes are provided for accommodating dowel rods and pipes of different diameters. The body holes 71A can also be used with a pipe clamp to create a vise and to support panels horizontally at different elevations. While only three body holes 71A are shown, more can be employed.

The ends 12,13 of the main body 11 are also contoured so as to form a generally horizontal outer ledge 73 and an outer upper flange 74. This is shown in detail in FIG. 16. With this arrangement, a substantially horizontal work shelf WS (FIG. 11) can be formed and maintained on the outer ledge 73 by insertion of a standard plank between this outer ledge 73 and outer upper flange 74.

Figure 11:
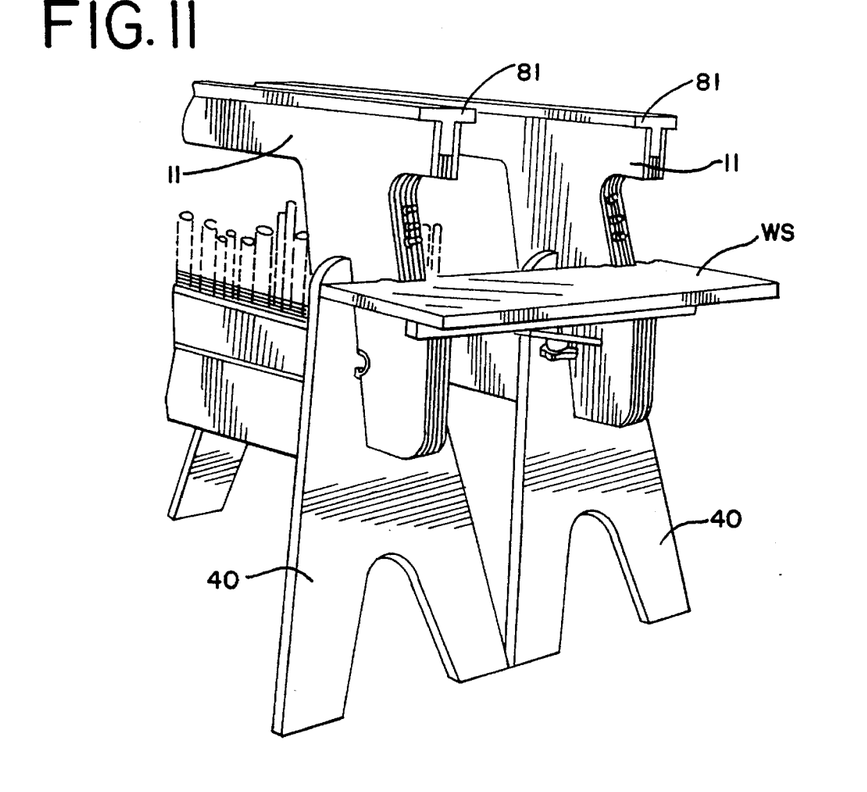
FIG. 11 is a second side perspective view of two parallel main bodies supporting a work shelf.

A more secure and sturdy horizontal work shelf WS can be formed and maintained, as is shown in FIG. 11, with the employment of a second main body 11 substantial similar to the first main body 11 positioned parallel one another by the insertion of a plank between both outer ledges 73 and both upper flanges 74 of both of the main bodies. Significantly, work planks P1 (shown as phantom lines in FIG. 16) having a cross-sectional thickness of up to the dimension A can be so held. In practice, dimension A is about ⅞" to hold planks P3 having a nominal width of ¾".

In addition, the end contour can include a notch, so as to form a second substantially horizontal outer upper flange 75 spaced above the first outer upper flange 74. Forming such a second outer flange 75 permits one to hold and maintain thicker planks P2 (also shown in phantom lines in FIG. 16) on the outer ledge 73. With this arrangement, work planks WP having a cross-sectional thickness of greater than the dimension A but less the dimension B can be so held. In practice, dimension B is about 1⅝" to hold planks having a nominal width of 1½".

In practice, it has been found that work shelf WS can be not only used to support tools, paints and work pieces, but also used as a step stool, a scaffold and as a picnic table or on-site food/beverage support. In addition, a plank horizontally supported in the manner just described can be also conveniently worked on, such as by sanding or drilling.

Figure 16:
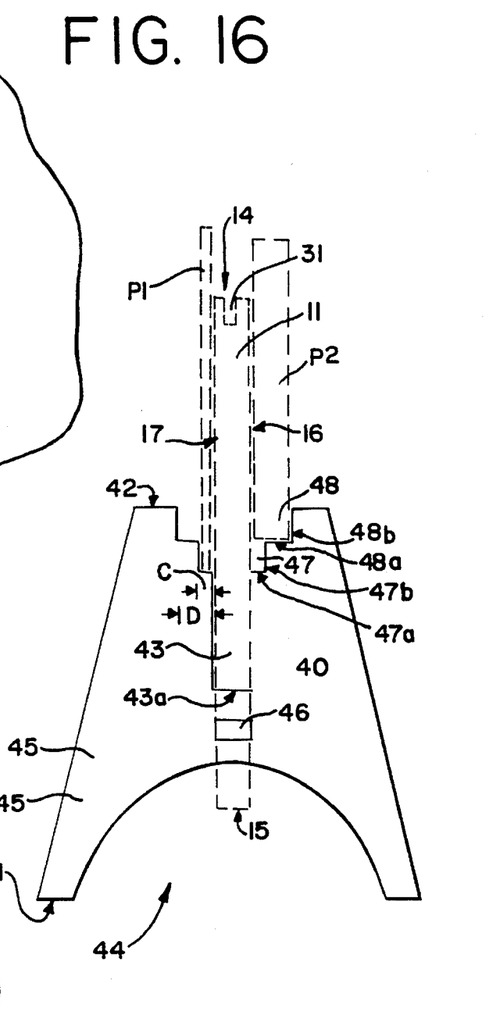
FIG. 16 is a side elevation view of a portion of the side contour of the main body shown in the Figures.

Shown in FIGS. 1 and 16, the outer ledge 73 is provided with a semicircular notch 73A. This semicircular notch 73A is used to support cylindrical pipes and dowel rods for cutting. In addition, with two parallel main bodies 11, a pipe supporting a spool of wire can be conveniently supported in the semicircular notch 73A, the spool being disposed between the two main bodies. With this arrangement, an individual can easily pull wire from the rotating spool.

Finally, with respect to the end contours 12,13, they can be contoured inwardly and provided with receptacles (not shown) formed therein for storing pins 33 used for retaining the top member 81, which will now be discussed.

The top 14 of the main body 11 is provided with an elongated longitudinal trough 31 therein. This trough 31 is preferably rectangular so as to receive a top member 81. As seen from an end elevation view (FIGS. 2 and 3), the top 14 of the main body 11 is U-shaped. The top member 81 cooperates with the top 14 of the main body 11 so as to have many functions and a multitude of uses, one of which is to expand the top surface of the carpentry work station 10.

In particular, the top member 81, shown in detail in FIGS. 4 and 5, is preferably T-shaped in cross-section, having a first leg 82 and opposed second leg 83, forming a top piece 85 and having an intersecting transverse third leg 84. Each of the three legs has side surfaces 82a, 83a, 84a and terminates at leg edge 82b, 83b, 84b at the distal end thereof. The top member 81 is constructed so as to cooperate with the top 14 of the main body 11. Specifically the top member 81 is easily slidable in the longitudinal trough 31 in the main body 11, as is shown generally in FIG. 6. In addition, the top member 81 is further constructed so as to be slidable in the top trough 31 when it is oriented in any one of three positions, i.e., with the first leg 82 facing down (FIG. 6), with the second leg 83 facing down (FIG. 6), and with the third leg 84 facing down (FIGS. 1 and 3).

Means are further provided for retaining and fixedly securing the top member 81 in any one of a plurality of positions relative to the main body 11. The means contemplated are pin holes 32,86 and pins 33. In particular, a plurality of spaced apart pin holes 32 are provided adjacent the top 14 of the main body 11. These pin holes 32 are aligned so as to be substantially horizontal and parallel the top 14. Each pin hole 32 has an opening piercing the side 16,17 of the main body 11, projects through the main body, and exits through an opening in the top trough 31 of the main body. In short, each pin hole extends from a side surface 12,13 into the top trough 31. Shown in FIGS. 4 and 5, the top member 81 also has a plurality of spaced apart pin holes 86 in and along the two sides 84a of the vertical third leg 84. Consequently, to fixedly secure the top member 81 to the main body 11, a pin 33 is inserted into a pair of aligned pin holes 32,86, one aligned pin hole 86 being in the top member 81 and the other aligned pin hole 32 being in the main body 11. Securement is often better when more then one pair of aligned holes are pinned together. For example, in practice, one may insert pins 33 into opposed pin holes 86 in both sides 84a of the third leg 84 and the corresponding opposed pin holes 32 adjacent the top 14 of the main body 11. Similarly, one may insert pins 33 into pin holes that are spaced apart so as to prevent any endward pivoting of the top member.

The slidable top member 81 permits a worker to expand the worker's working surface by merely sliding the top member 31, such that it extends beyond the sides 12,13 of the main body 11 and locking the top member into position. With two main bodies 11 positioned parallel one another, large tables and work surfaces can be made. See, e.g., FIG. 12.

For example, with the two main bodies positioned parallel one another and with both top members extended outwardly and locked into position (i.e., FIG. 3), a large piece of material such as a door, may be rested on top of the top members. This large piece of material can be cut without fear of cutting through the main bodies, since the piece rests in position spaced above the main bodies, and without fear of either the piece being cut and the cut piece falling to the ground. This added attribute protects not only the work piece but the person work with it. Or, a work piece may be placed onto the main bodies and pressed against the ends of the top member such that the top member acts as a stop. With the work piece pressed against the ends of the top member, the work piece can be more accurately cut, drilled, sanded, etc. with a reduced risk of the work piece sliding away.

Pin holes 86, that are spaced apart, are also provided along the sides 82a, 83a of the other two legs 82,83 and along the edges 82b, 83b, 84b of the three top member legs 82,83,84. Thus, when any one of the three legs 82,83,84 is placed into the trough 31, the top member 81 can be locked into position. Moreover, these additional pin holes can be used to engage additional items, such as a rail member, fence element, clamp or corner member.

While in the figures the top member legs 82,83,84 appear to be the same length, it is appreciated that each leg may be of a different length. Thus, any one of the three top member legs can be placed and locked into the trough of the main body.

In the normal orientation with the third leg 84 in the main body trough 31, the top surface 85 is flat. See FIG. 1. With either the first leg 82 or second leg 83 locked in the trough 31, the top, exposed surface is "L-shaped." An example of this orientation is shown in FIG. 6. The direction and height of the "L" is changeable depending on which of the first or second leg is locked into the trough. Significantly, with either of the first or second leg locked into the trough, one can do deep sawing because the work piece is held further off the horse or main body.

While the mating between the top member and the main body has been described with the top member being T-shaped and the top of the main body being U-shaped, it is appreciated that the top of the main body may be made rectangular and the top member may be U-shaped so as to saddle the top of the main body. The use of the pins would be the same. Further, if desired, the top of the main body and the bottom portion of the top member may be any desired shape, such as triangular and trapezoidal. The pieces would, of course, be sized so that one of either the top of the main body or the bottom of the top section saddled the other piece.

Figure 8:
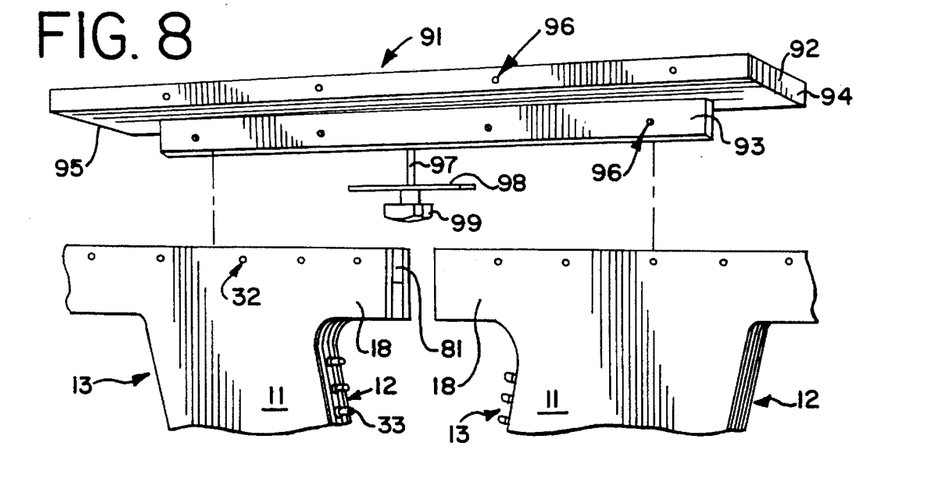
FIG. 8 is an exploded side perspective view of the central top member, the two top portions and the two main bodies shown in FIG. 7.
Figure 9:
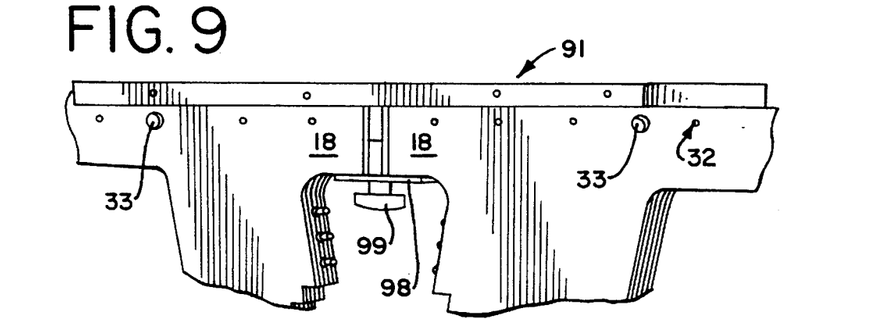
FIG. 9 is the a side perspective view of the assembled central top member, the two top portions and the two main bodies shown in FIG. 8.

The carpentry work station 10 of the present invention can be easily formed or transformed into a power miter box stand. Turning to FIGS. 7, 8 and 9, a power miter box stand is made using (1) two main bodies 11, each supported by its two legs 40, positioned adjacent an end of the other, (2) two top members 81, (3) a central top member 91, and (4) two rail members 100. The central top member 91 is T-shaped in cross-section and has a horizontal portion 92, a vertical portion 93 and two ends 94,95. The horizontal section 92 of the central top section 91 is preferably greater in transverse width than the transverse width of the top members 81. Both the horizontal portion 92 and the vertical portion 93 of the central top member 91 have a plurality of spaced apart pin holes 96, in and along their side surfaces. The vertical portion 92 of the central member 91 is positioned in the upper troughs 81 of the two adjacent main bodies 11 so as to bridge the two main bodies. The central top member 91 is further secured to the main bodies 11 by pins 33 in the same manner as described above with respect to the top members 81. In addition and in a similar manner, each of the top members 81 is secured with pins 33 to a main body 11 adjacent an end 94,95 of the central top member 91.

The central top member 91 includes further securement means for fixedly connecting it to the two main bodies 11. This additional securement means comprises a rod 97 having external threads (not shown) thereon connected to and projecting downwardly from the vertical portion 93 of the central top member 93, a wheel member 99 having internal threads (not shown) therein for cooperating with the male threads of the rod 97, and a horizontal bar 98 disposed between the vertical portion 93 and the wheel member 99. For securement, the rod 97 is positioned between the adjacent ends 12,13 of the first main body 11 and the second main body 11 and a portion or projection 18 of each main body 11, formed by the end contours in the main body, is clamped between the horizontal bar 98 and the horizontal portion 92 of the central top member 91. The distance between the horizontal bar 98 and the horizontal portion 92 of the central top member 91 is controllable by turning the wheel member 99.

After securement, the back saw and reference miter guides or power miter box (not shown) can be attached to or held on the central top member 91.

The carpentry work station of the present invention can further be easily formed into a small power miter box stand. Instead of using two main bodies, as is shown in FIGS. 7, 8 and 9, the small power miter box stand is made using (1) only one main body, supported by its two legs, (2) two top members, (3) a central top member (with the rod 97, horizontal bar 98 and wheel member 99 removed), and (4) two rail members. The central top member is secured to the sole main body in the center thereof by pins in the same manner described above and each of the two top members are secured with pins to the main body adjacent an end of the central top member. As before, the back saw and reference miter guides or miter box (not shown) can be attached to or held on the central top member 91.

Figure 10:
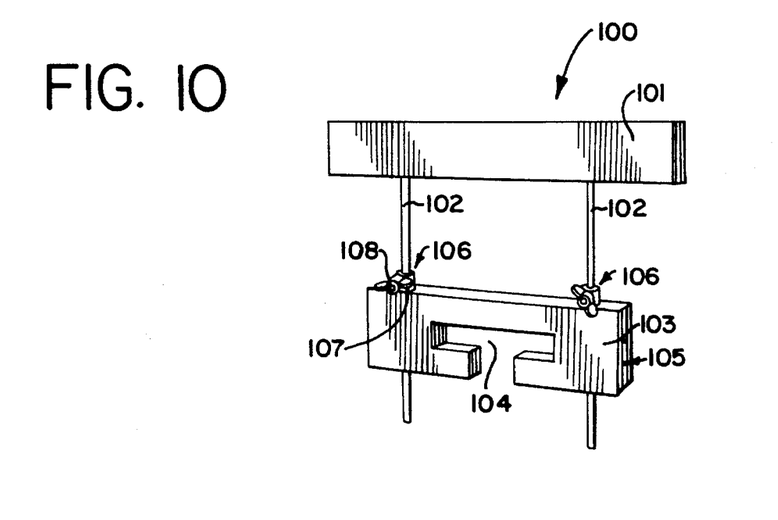
FIG. 10 is a side perspective view of a rail shown in FIG. 7.

The rail members 100 connected to the top members 81 are shown generally in FIG. 7 and specifically in FIG. 10. These rail members 100 provide a perch or wall to support a work piece above the main body 11 and top member 81. The rail member 100 includes an adjustable rest 101. This rest 101 is adjustable at various vertical heights to accommodate different power miter boxes on the market. Accordingly, the miter box stand of the present invention is not dependent on any particular brand of miter box. The rest 101 has two downwardly depending parallel rods 102 connected thereto, a channel member 103 having two apertures therein for receiving the rods, and fasteners 106 for locking the rest 101 in a desired position. In particular, the channel member 103 has a T-shaped internal passage 104 for receiving a top member which is slidable therein. Pin holes 105 are also provided in the side of the channel members 103 that pass through into the internal passage 104 for alignment with one of the many pin holes 86 in the leg edges 82b, 83b, 84b (FIG. 5) in the top member 81. The rail member 100 can thus be fixedly secured to the top member 81 by inserting pins 33 into aligned pin holes 86,105. As noted above, the distance between the rest 101 and the channel member 103 is adjustable. To this end, a fastener 106 cooperating with the parallel rods 102 is provided. The fasteners 106 comprise a housing 107 with an aperture having internal threading (not shown) and a threaded stud 108. The threaded stud 108 is screwed into the aperture in the housing 107 to frictionally engage the rod 102. By loosening and tightening the threaded stud 108, the stop can be adjusted, i.e., raised and lowered.

The carpentry work station of the present invention can still further be easily formed into a table saw stand. Shown in FIGS. 12, 13 and 14, two main bodies 11 are positioned generally parallel one another and a table element 110 having a top surface 111 and a bottom surface 112 and a blade slot 113 therein is connected to the main bodies. The bottom surface 112, shown in detail in FIG. 14, has a first pair of outwardly projecting parallel posts 114 and a second pair of outwardly extending posts 115. The posts 114,115 are constructed to fit into the longitudinal top troughs 31 in the main body. Like the top members 81 and the center top member 91, the sides of the post 114,115 have pin holes 116 therein. Thus, a pair of parallel posts 114 can be put into the parallel troughs 31 and locked into the desired position by pins 33 inserted into aligned pin holes 32,116 in the manner detailed previously. If the first pair of posts 114 are secured in the elongated troughs 31, the blade slot 113, and consequently the saw blade X, will be disposed parallel and in-between the two main bodies. If, on the other hand, the second pair of posts 115 are secured in the elongated troughs 31, the blade slot 113 and blade X will be disposed perpendicular and in-between the two mains bodies. The saw and blade X can be attached to the bottom surface 112 of the table element 110 by known conventional means.

Figure 12:
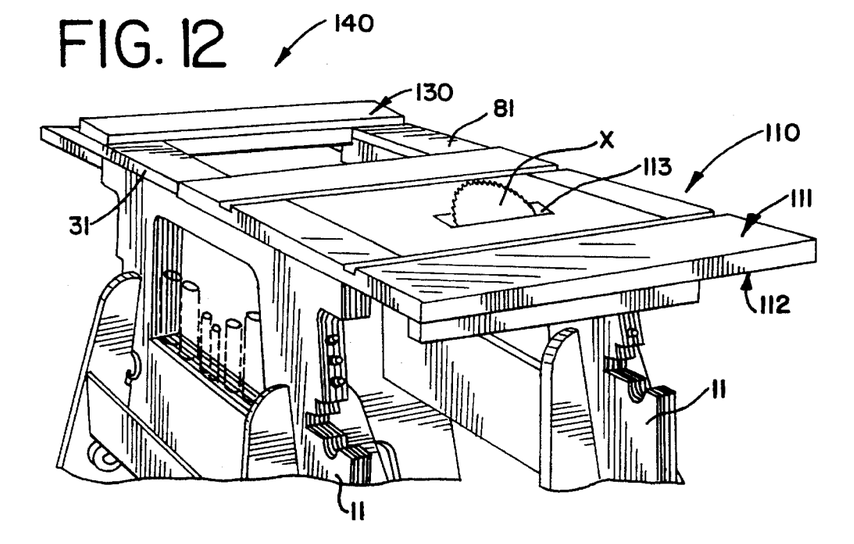
FIG. 12 is a second side perspective view of the carpentry work station made in accordance with the teachings of the present embodiment transformed into a table saw stand.
Figure 13:
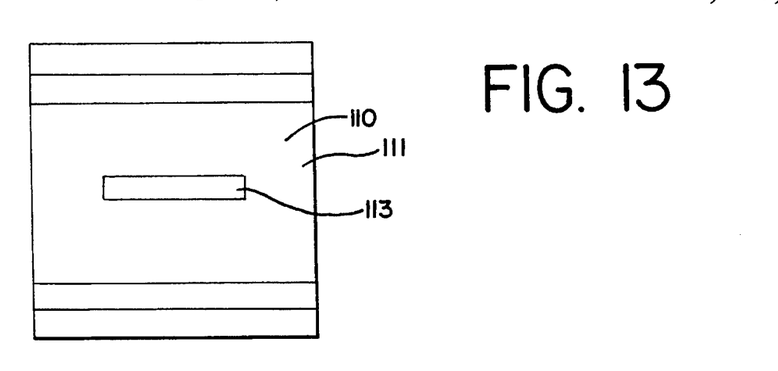
FIG. 13 is a top plan view of the table element shown in FIG. 12.

As seen in FIG. 12, the top members 81 are secured into the top troughs 31 of the main bodies adjacent the table element 110 for providing added work and support surfaces.

A fence element 140 and an intermediate support 130 are secured to the top members 81 in any one of a plurality of positions for providing a boundary of abutting surface for any work on the top surfaces 111,85 of the table element and top members.

Turning to FIG. 10, the intermediate support 130 is a T-shaped piece that fits onto the two parallel top members 81. The support 130 has an upper surface 131 spaced above the top surface of the top member. Preferably, the upper surface 131 is level and flush with the top surface 111 of the table element 110 (FIG. 12). In this manner, a work piece, such as a plank, will be supported level, as opposed to sagging or bowing, when it is disposed on the table saw stand. In short, the intermediate support 130 supports work that is between the table element 110 and the fence element 140.

The fence element 140 also fits on to the top members 81. It includes an L-shaped block 141 having a front face 142. It further includes locking means which permits it to be moved along the top members and locked in a desired location. The locking means includes a strike plate 143 having a circular head 144 and a contact plate 145. Apertures 146 are provided within the contact plate 145 for receiving adjustment means, i.e. screws 147. A channel 148 is provided in the front face 142 of the fence element 140 for receiving the strike plate 143.

A side slot 151 is provided on the side of the L-shaped block that extends to the channel 148 for receiving a rod or lever 152. The rod 552 has a gripping knob 152 at one end and a cam 154 is attached at the other end. The cam 154 is fastened to the block 141 by conventional means. Thus, by moving the gripping knob 153 downwardly, the cam 154 is driven into the contact plate 145, which, in turn, is driven into the top member 81. The adjustment means 147 actually contact the top member. To release and move the fence 140, the knob 153 is moved upwards.

At times it is necessary to support items above the main body, or to have an abutment to keep objects from moving. To this end, a stop block 120 is provided. Shown in FIG. 15, the stop block 12 has a first end with a flat surface 121 and an opposed second end with two inclined surfaces 122. Pin holes 123 are provided in the sides of the stop block 120. The block 120 further has a thickness that permits it to fit in the longitudinal trough 31 of the main body 11.

Figures 14, 15:
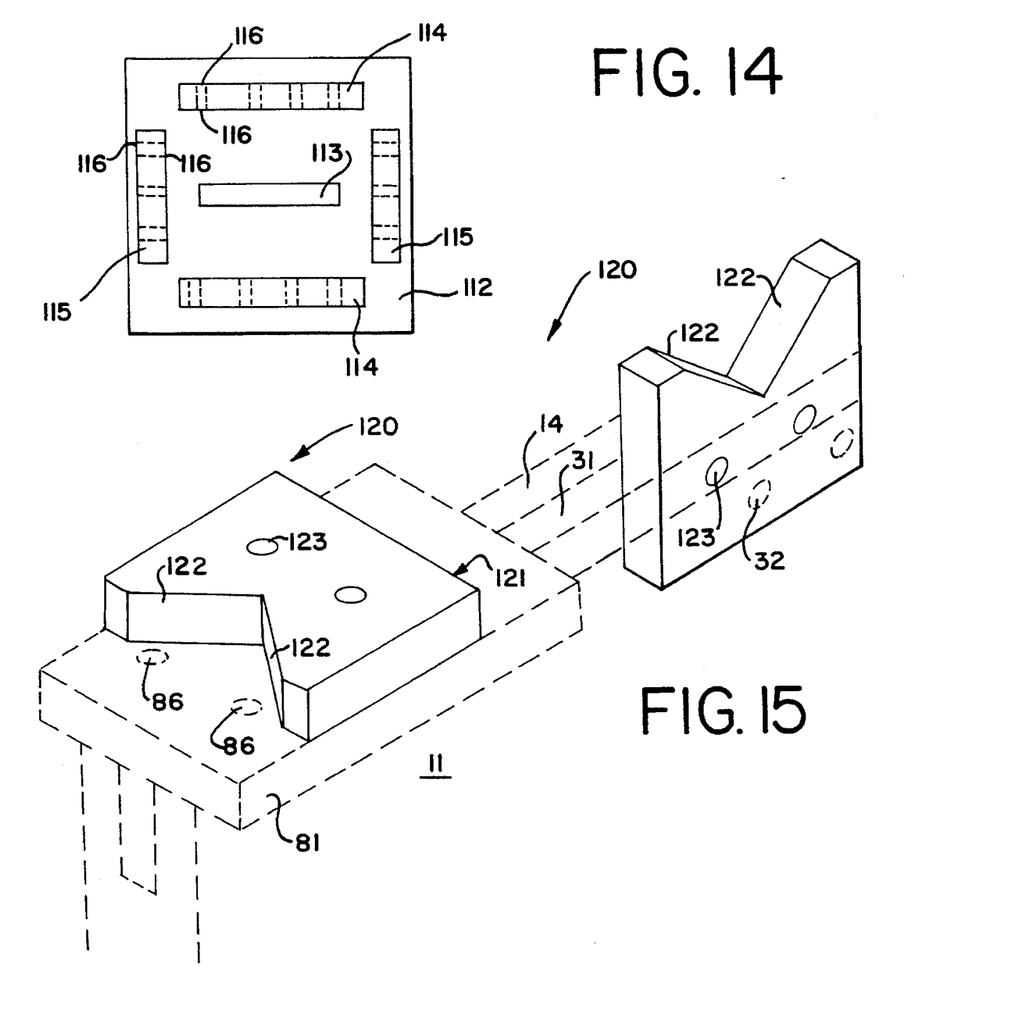
FIG. 14 is a bottom plan view of the table element shown in FIGS. 12 and 13.
FIG. 15 is an isometric view of a stop block.

The inclined surfaces 122 are used for supporting items such as pipes and dowel rods. In either of the orientations discussed below, the stop block 120 can act as an abutment or stop or as a supporting structure.

Thus, one can use the block, as shown on the left side of FIG. 15, with a top member 81. The stop block 120 can be secured by pins put into the side pin hole 123 and the pin holes 86 of the top member 81. Or, one can use the block, as shown on the right side of FIG. 15, with the main body 11. The block 120 is put into the longitudinal trough 31 and locked with pins put into the side pin holes 123 and pin holes 32 adjacent the top of the main body.

Figure 22:
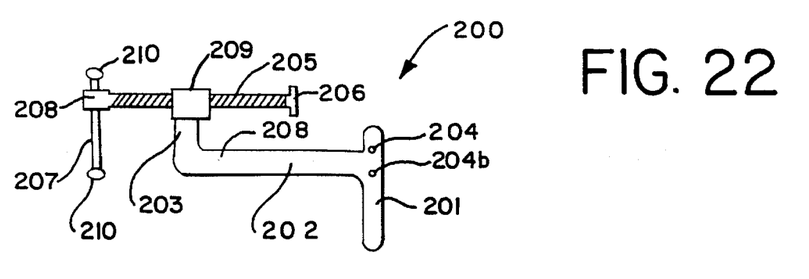
FIG. 22 is a side elevation view of a clamp member.

FIG. 22 shows a clamp member 200 that can be used with the main body 11 of the present invention to hold workpieces. The clamp member 200 includes a horizontal post 202 integral at one end with a vertical post 201 and integral at the other end with a neck portion 203. The vertical post 201 extends substantially perpendicular both above and below the horizonal post 202 while the neck portion 203 extends only above the horizontal post 202. A first coupler 209 having internal threading is secured to the distal end of the neck portion 203. A threaded rod 205 has a head 206 having a flat leading surface for contacting the items to be clamped is pivotally connected to one end and a second coupler 208 is connected at the other end. The threaded rod 205 is threaded into the first coupler 209. A turn bar 207 having spherical stops 201 at each end is slideably mounted within the second coupler 208. Accordingly, when the turn bar is rotated, the threaded rod 205 and head 206 move relative to the neck portion 203 and vertical post 202 in a direction substantially parallel to the horizontal post 202.

Two holes 204a, 204b, one above the other, are put into the vertical post 202 for receiving pins 33. Similarly, a pin notch 208 is put in the upper surface of the horizontal bar 202 adjacent the neck portion 203 for also receiving pins 33.

Figure 23:
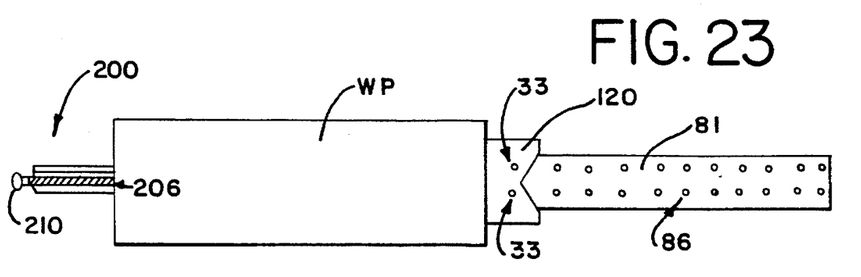
FIG. 23 is a top plan view of the clamp member of FIG. 22 oriented one way and in use.
Figure 24:
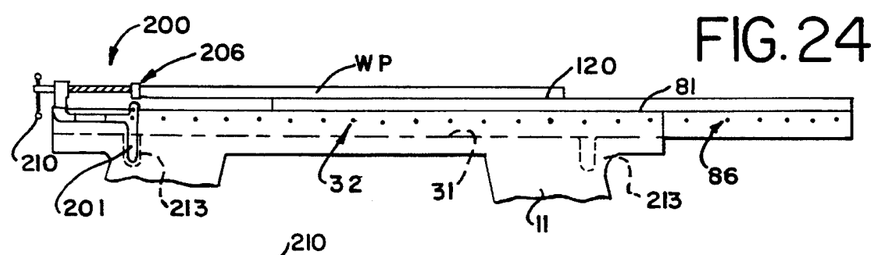
FIG. 24 is a side elevation view of the clamp member of FIG. 23.
Figure 25:
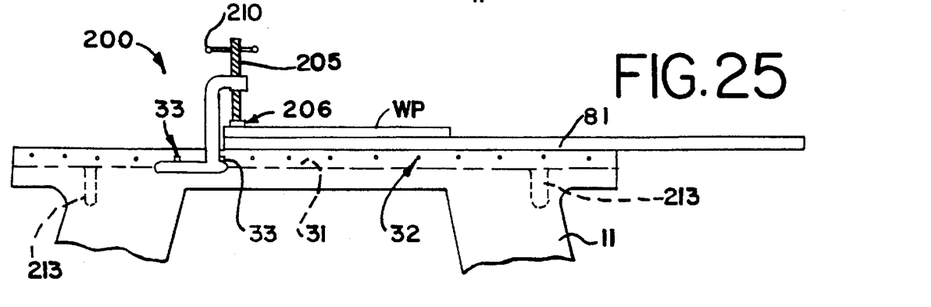
FIG. 25 is a side elevation view of the clamp member of FIG. 22 oriented another way and in use.

FIGS. 23–25 show the clamp member 200 in use. Specifically, FIGS. 23 and 24 show the clamp member 200 oriented in the horizontal position. In this orientation, a workpiece WP can be clamped between the clamp member 200 and the top member 91 or the stop block 120 pinned into place on top of the top member 81. To lock the clamp member 200 into the main body 11, the vertical post 201 is placed into a receptacle 213 (shown in phantom lines) depending downwardly from the bottom surface of the top trough 31 and configured to receive the vertical post 201. A pin 33 is put through the pin hole 32 in the main body 11 and into one of the two holes 204a, 204b in the vertical post 201. A pin 33 is also put into a second pin hole 32 and into the pin notch 208 to prevent the clamp member 200 from rotating. The clamp member 200 is then adjusted so that the head 206 thereof abuts the workpiece WP. The two holes 204a, 204b in the vertical post 201 permit the clamp to be positioned in at least two heights. If the upper hole 204a is used, the threaded rod 205 and head 206 will be just above the top of the main body 11 so as to clamp workpieces WP resting on the main body between the clamp member 200 and the top member 81. If the lower hole 204b is used, the threaded rod 205 and head 206 will be higher than when the upper hole 204a is used, permitting the clamping of workpieces WP resting on the top member 81. In FIG. 24, the lower hole 204b receives the pin 33.

Vertical receptacles 213 are provided at both sides of each main body 11, permitting clamping on either side of the main bodies.

FIG. 25 shows the clamping member 200 oriented in the vertical position. In this orientation, a workpiece WP can be clamped vertically and held between the clamp head 206 and the top of the main body 11 or the top member 81. In this orientation, pins 33 are put through two pin holes 32 in the main body. The pins 33 are positioned on each side of the horizontal post 202 to lock the clamping member 200 into position. The clamp member 200 is adjusted in the manner described above.

Finally, with respect to materials, the work station shown in the Figures is composed of laminated wood. However, the station can be made, if desired, of plastic, solid wood or metal or a combination of materials.

While the specific embodiments have been illustrated and described, numerous modifications come to mind without significantly departing from the spirit of the invention and the scope of protection is only limited by the scope of the accompanying claims.

I claim:

1. A carpentry work station comprising:
   a main body for supporting the work above the ground and having a top surface with a top surface area and with a longitudinal trough therein, said trough having a bottom wall and two side walls; and,
   an elongated T-shaped top member adapted for expanding said top surface area and having three top member legs, each leg being adapted to be received in said trough of said main body, with first interconnection means thereon for cooperating with second interconnection means on at least one said side wall to selectively interlock said top surface means and said main body.

2. The carpentry work station as defined in claim 1, further including separate means for cooperating with both said first and said second interconnection means and for retaining said top surface means in any one of a plurality of positions.

3. The carpentry work station as defined in claim 2, wherein said retaining means is a pin.

4. A carpentry work station comprising:
   a main body having opposed ends, opposed sides and a top and a bottom;
   means for supporting said main body above the ground;
   an elongated T-shaped top member for expanding said top surface area and having three top member legs, each leg projecting therefrom and cooperating with said main body, said top of said main body having a trough with a bottom and two adjacent side walls for receiving said leg of said top member, each said top member leg being adapted to be received in said trough of said main body; and,
   means cooperating with at least one said trough side wall and said leg of said top member for fixedly securing said top member to said main body in any one of a plurality of positions.

5. The carpentry work station as defined in claim 4, wherein said top member has at least one pin hole therein,
said main body has a plurality of pin holes therein adjacent said top, and
said means for fixedly securing said top member to said main body is a pin inserted into a pair of aligned pin holes,
   one said aligned pin hole being in said top member and said other aligned pin hole being in said main body.

6. The carpentry work station as defined in claim 4, wherein
said top member a plurality of pin holes therein,
said main body has at least one pin hole therein adjacent said top, and
said means for fixedly securing said top member to said main body is a pin inserted into a pair of aligned pin holes,
   one said aligned pin hole being in said top member and said other aligned pin hole being in said main body.

7. A carpentry work station comprising:
   a main body having a opposed ends, opposed sides and a top and a bottom,
   said top of said main body having a longitudinal trough therein with a bottom surface and at least two other surfaces therein;
   means for supporting said main body above the ground;
   an elongated T-shaped top member adapted to be received in said trough of said main body, adapted for expanding said top surface area and having three top member legs, each leg being adapted to be received in said trough of said main body; and,
   means for interconnecting at least one of said other surfaces of said trough and each said leg of said top member separately and adapted for fixedly securing said top member in said trough of said main body in any one of a plurality of positions.

8. The carpentry work station as defined in claim 7, wherein
one of said main body and one said top member leg has at least one pin hole therein and said other of said main body and said one said top member leg has at least two pin holes therein,
said pin hole in said main body extending from one said side into said trough, and
said means for fixedly securing said top member to said main body is a pin inserted into a pair of aligned pin holes,
   one said aligned pin hole being in said top member leg and said other aligned pin hole being in said main body.

9. The carpentry work station as defined in claim 7, wherein
said main body has a plurality of pin holes therein adjacent said top extending from one said side into said trough,
one said top member leg has a plurality of pin holes therein, and
said means for fixedly securing said top member to said main body is a pin inserted into a pair of aligned pin holes,
   one said aligned pin hole being in said top member leg and said other aligned pin hole being in said main body.

10. The carpentry work station as defined in claim 9, wherein
each said top member leg has a plurality of pin holes therein so as to permit said top member to be fixedly secured to said main body in any number of orientations by the insertion of a pin into a pair of aligned pin holes, one said pin hole being in said top member leg and said other of said aligned pin holes being in said main body adjacent said top and extending from one said side into said trough.

11. A carpentry work station as defined in claim 7, wherein said main body has a body cut-out therein.

12. The carpentry work station as defined in claim 7, wherein one said end of said main body is contoured so as to form a generally horizontal ledge and an upper flange, a substantially horizontal work shelf being formed and maintained by insertion of a plank between said ledge and said upper flange.

13. The carpentry work station as defined in claim 12, further including a second main body substantial similar to a first main body positioned parallel one another, a substantially horizontal work shelf being formed and maintained by insertion of a plank between said ledges and said upper flanges of said first main body and said second main body.

14. The carpentry work station as defined in claim 12, wherein one said end of said main body is contoured so as to form a generally horizontal ledge and a first upper flange and a second upper flange spaced above said first upper flange, a substantially horizontal work shelf being formed and maintained by insertion of a plank between said ledge and one of said first upper flange and said second upper flange.

15. The carpentry work station as defined in claim 14, further including a second main body substantial similar to a first main body positioned parallel one another, a substantially horizontal work shelf being formed and maintained by insertion of a plank between said ledges and one of said first upper flanges and said second upper flanges of said first main body and said second main body.

16. The carpentry work station as defined in claim 14, wherein one said end of said main body is contoured inwardly and has at least one receptacle formed therein for storing said means for fixedly securing said top member in said trough of said main body.

17. The carpentry work station as defined in claim 16, wherein said receptacle is a pin hole and said means for retaining said top member to said main body is a pin.

18. A carpentry work station comprising:

a main body having opposed ends, opposed sides and a top and a bottom, said top of said main body having a longitudinal trough therein;

means for supporting said main body above the ground;

a top member received in said trough of said main body, said top member being an elongated T-shaped member having three top member legs, each said top member leg fitting into said trough; and, means for fixedly securing said top member in said trough of said main body in any one of a plurality of positions.

19. A carpentry work station comprising:

a main body having opposed ends, opposed sides and a top and a bottom, said main body including a body cut-out therein and a body pocket formed therein between said sides and adjacent said body cut out, said top of said main body having a longitudinal trough therein;

means for supporting said main body above the ground;

a top member received in said trough of said main body; and, means for fixedly securing said top member in said trough of said main body in any one of a plurality of positions.

20. A carpentry work station comprising:

an elongated vertical main body having a opposed ends, opposed sides, a top and a bottom, said bottom having at least two inwardly projecting elongated leg channels spaced apart from one another, each terminating at a leg channel abutment therein;

a pair of legs, each leg having a leg top and a leg bottom, said leg top having a downwardly projecting elongated leg slot terminating at a leg slot abutment for cooperating with one said channel slot, each said leg being slottably connected to said main body by having each said leg channel in said main body receive one said leg slot of said leg such that said leg channel abutment and said leg slot abutment generally abut one another, a portion of said main body being positioned within said leg slot and a portion of said leg being positioned within said leg channel and, at least one said side of said main body being substantially vertical and one of said leg slots including a slot notch forming a generally horizontal slot ledge and a generally vertical slot holding wall therein for holding a plank substantially vertical on said slot ledge between said one said side of said main body and said slot holding wall.

21. The carpentry work station as defined in claim 20, wherein both of said leg slots include a slot notch forming a generally horizonal slot ledge and a generally vertical slot holding wall therein, said legs being slottably connected to and oriented with respect to said main body so that a plank can be held substantially vertical on said slot ledges of both said legs between said one said side of said main body and said slot holding walls of both said legs.

22. The carpentry work station as defined in claim 20, wherein said slot notch is a first slot notch forming a generally horizonal first slot ledge and a generally vertical first slot holding wall therein and further including a second slot notch forming a generally horizontal second slot ledge and a generally vertical second slot holding wall therein for holding a plank substantially vertical on one of said first slot ledge and said second slot ledge between said one said side of said main body and one of said first slot holding wall and said second slot holding wall.

23. The carpentry work station as defined in claim 20, wherein both of said leg slots include a first slot notch forming a generally horizonal first slot ledge and a generally vertical first slot holding wall therein and a second slot notch forming a generally horizonal second slot ledge and a generally vertical second slot holding wall therein, said legs being slottably connected to and oriented with respect to said main body so that a plank can be held substantially vertical on one of said first slot ledges and said second slot ledges of both said legs between said one said side of said main body and one of said first said slot holding wall and said second slot holding wall of both said legs.

24. A carpentry work station comprising:

an elongated vertical main body having opposed ends, opposed sides, a top and a bottom, said bottom having at least two inwardly projecting elongated leg channels spaced apart from one another, each terminating at a leg channel abutment therein;

a pair of legs, each leg having a leg top and a leg bottom,
said leg top having a downwardly projecting elongated
leg slot terminating at a leg slot abutment for cooperating with one said channel slot, each said leg being
slottably connected to said main body by having each
said leg channel in said main body receive one said leg
slot of said leg such that said leg channel abutment and
said leg slot abutment generally abut one another, a
portion of said main body being positioned within said
leg slot and a portion of said leg being positioned
within said leg channel, at least one said side of said
main body being substantially vertical and one of said
leg slots includes a slot notch forming a generally
horizonal slot ledge and a generally vertical slot holding wall therein for holding a plank substantially vertical on said slot ledge between said one said side of
said main body and said slot holding wall; and, means for locking said legs to said main body which
includes opposed leg indents below said leg slot in each
said leg and a leg channel cavity in each said leg
channel with a strip spring fastened to said leg channel
abutment, said strip spring being positioned completely
in said leg channel cavity and being generally circular
with two ends forming an opening therein and having
an inwardly projecting nub at each end for frictionally
engaging said leg indents when said leg is slottably
connected to said main body.

25. A carpentry work station comprising:

an elongated vertical main body having a opposed ends,
opposed sides, a top and a bottom, said bottom having at least two inwardly projecting
elongated leg channels spaced apart from one another,
each terminating at a leg channel abutment therein;

a pair of legs, each leg having a leg top and a leg bottom, said leg top having a downwardly projecting elongated
leg slot terminating at a leg slot abutment for cooperating with one said channel slot, each said leg being slottably connected to said main body
by having each said leg channel in said main body
receive one said leg slot of said leg such that said leg
channel abutment and said leg slot abutment generally
abut one another, a portion of said main body being positioned within said
leg slot and a portion of said leg being positioned
within said leg channel, said bottom of said main body having a carrier extension
fixedly secured thereto extending outwardly in a direction away from one side of said main body, said carrier extension having a plurality of wheels extending downwardly therefrom and an upwardly projecting
carrier flange fixedly secured to the distal end of said
carrier extension forming a carrier below said top of
said main body between said one side of said main
body and said carrier flange adjacent said bottom of
said main body.

26. The carpentry work station as defined in claim 25,
wherein the width of said carrier is dimensioned so as to
hold either a second main body and two legs, or two legs on
said carrier adjacent said side of said first main body
between said one side of said first main body and said carrier
flange.

27. The carpentry work station as defined in claim 25,
further including a second carrier extension fixedly secured
to said bottom of said main body extending outwardly to a
direction away from a side of said main body opposed from
said one side, said second carrier extension having an
upwardly projecting second carrier flange secured to the
distal end of said carrier extension forming a second carrier
between said opposed side of said main body and said
second carrier flange adjacent said bottom of said main
body.

28. The carpentry work station as defined in claim 27,
further including a plurality of wheels extending downwardly from said carrier extensions.

29. The carpentry work station as defined in claim 28
wherein the width of said carrier is dimensioned so as to
hold a second main body and two legs on said carrier
adjacent said one side of said first main body and said carrier
flange and the width of said second carrier is dimensioned so
as to hold two legs on said carrier adjacent said opposed side
of said first main body between said opposed side of said
first main body and said second carrier flange.

30. A carpentry work station forming a table saw stand
comprising:

a first main body and a second main body,
each said main body having opposed ends, opposed
sides and a top and a bottom,
said first main body being position generally parallel
said second main body,
said top of each of said main bodies having a
longitudinal trough therein;

means for supporting said first main body and said second
main body above the ground at equal heights;

a table element having a top surface and a bottom surface
and a blade slot therein,
said bottom surface having a pair of outwardly projecting parallel posts,
one said post fitting into said trough in said first main
body and the other said post fitting into said trough
of said second main body; and, means for fixedly securing a saw adjacent said bottom
surface of said table element with the saw blade projecting through said blade slot.

31. The carpentry work station forming a table saw stand
as defined in claim 30, wherein said table element has a
second pair of outwardly projecting posts permitting said
table element to be oriented such that said blade slot is either
parallel said parallel first and second main bodies or transverse said parallel first and second main bodies.

32. The carpentry work station forming a table saw stand
as defined in claim 30, wherein each of said first and said second main bodies has a pin
holes therein extending from one said side into said
trough and each of said posts has a pin hole therein,
said table element being fixedly secured to said first and
said second main body by a pin inserted into pairs of
aligned pin holes,
a first pair of aligned pin holes being said pin hole in
one said post and one said pin hole in said first
main body,
a second pair of aligned pin holes being said pin hole
in the other said post and one said pin hole in said
second main body.

33. The carpentry work station forming a table saw stand
as defined in claim 32, further including a saw fence element
for fixedly securing to said table element in any one of a
plurality of positions providing a boundary for any work on
said top surface of said table element.

34. The carpentry work station forming a table saw stand
as defined in claim 33, further including a first top member having opposed ends received in said
trough of said first main body and a second top member having opposed ends received in said trough of said second main body, said first and said second top members being positioned adjacent said table element.

35. The carpentry work station forming a table saw stand as defined in claim 34, wherein each of said first and second main bodies has at least two pin holes therein extending from one said side into said trough and each of said top members has a pin hole therein, each said top member being fixedly secured to one said main body by a pin inserted into pairs of aligned pin holes, a first pair of aligned pin holes being said pin hole in said first top member and one said pin hole in said first main body, a second pair of aligned pin holes being said pin hole in said second top member and one said pin hole in said second main body.

36. The carpentry work station forming a table saw stand as defined in claim 35, further including a saw rail element for fixedly securing to both said top members in any one of a plurality of positions providing a boundary transverse to said top members for any work on the top surfaces of said top members.

37. A table saw element for use in combination with a first main body and a second main body, each main body having opposed sides and a top and a bottom, the first main body being positioned generally parallel to the second main body, the top of each of the main bodies having a longitudinal trough therein, comprising:

a top surface and a bottom surface and a blade slot therein, said bottom surface having a pair of outwardly projection parallel posts, one said post fitting into the trough in the first main body and the other post fitting into the trough of the second main body.

38. The table saw element as defined in claim 37, further including a second pair of outwardly projecting posts permitting the table saw element to be oriented such that said blade slot is either parallel the parallel first and second main bodies or transverse the parallel first and second main bodies.

39. The table saw element as defined in claim 38, wherein each of the first and the second main bodies has a pin holes therein extending from one side into the trough and each of said posts has a pin hole therein, the table saw element being fixedly secured to the first and the second main bodies by a pin inserted into pairs of aligned pin holes, a first pair of aligned pin holes being said pin hole in one said post and the pin hole in the first main body, a second pair of aligned pin holes being said pin hole in the other said post and the pin hole in the second main body.

40. The table saw element as defined in claim 39, further including a saw fence element for fixedly securing to the table element in any one of a plurality of positions providing a boundary for any work on said top surface of the table element.

41. A tool table element for use in combination with a first main body and a second main body, each main body having opposed ends, opposed sides and a top and a bottom, the first main body being position generally parallel to the second main body, the top of each of the main bodies having a longitudinal trough therein, comprising:

a top surface and a bottom surface;

said bottom surface having a pair of outwardly projecting parallel posts, one said post fitting into the trough in the first main body and the other said post fitting into the trough of the second main body; and, means for fixedly securing a tool to the table tool element.

42. The tool table element as defined in claim 41, further including a second pair of outwardly projecting posts permitting the table tool element to be oriented such that said blade slot is either parallel the parallel first and second main bodies or transverse the parallel first and second main bodies.

43. The tool table element as defined in claim 42, wherein each of the first and the second main bodies has a pin holes therein extending from one side into the trough and each of said posts has a pin hole therein, the tool table saw element being fixedly secured to the first and the second main bodies by a pin inserted into pairs of aligned pin holes, a first pair of aligned pin holes being said pin hole in one said post and the pin hole in the first main body, a second pair of aligned pin holes being said pin hole in the other said post and the pin hole in the second main body.

44. A carpentry work station comprising:

a main body having a top surface with a top surface area with a first cross-sectional width and a longitudinal trough having a second cross-sectional width therein, said trough having a bottom wall and two side walls; and, an elongated T-shaped top member having a top member top surface and at least one leg projecting therefrom into said trough adapted for expanding said top surface area, said one leg including first interconnection means thereon for cooperating with second interconnection means on at least one said side wall to selectively interlock said top member in said trough in said main body in any one of a plurality of positions, said one leg having a cross-sectional width slightly smaller than said second cross-sectional width and said top member top surface having a third cross-sectional width, said third cross-sectional width being greater than said first and said second cross-sectional widths.

45. The carpentry work station as defined in claim 44 further including means for supporting said main body above the ground and wherein said top of said main body has said trough for receiving a leg projecting from said top member.

46. The carpentry work station as defined in claim 45, wherein said top member has at least one pin hole therein, said main body has a plurality of pin holes therein adjacent said top, and said cooperating means for fixedly securing said top member to said main body is a pin inserted into a pair of aligned pin holes, one said aligned pin hole being in said top member and said other aligned pin hole being in said main body.

47. The carpentry work station as defined in claim 44, wherein one of said main body and said top member leg has at least one pin hole therein and said other of said main body and said one said top member leg has at least two pin holes therein, said pin hole in said main body extending from one said opposed side into said trough, and said means for interconnecting said top member to said main body is a pin inserted into a pair of aligned pin holes, one said aligned pin hole being in said top member leg and said other aligned pin hole being in said main body.

* * * * *